(12) United States Patent  
Pollock et al.

(10) Patent No.: US 6,646,406 B1  
(45) Date of Patent: Nov. 11, 2003

(54) ELECTRICAL MACHINES

(75) Inventors: Charles Pollock, Rutland (GB); Helen Geraldine Phyllis Pollock, Rutland (GB); Richard Thomas Walter, Towson, MD (US)

(73) Assignees: Black & Decker Inc., Newark, DE (US); University of Warwick, Warwichshire (GB)

( * ) Notice: Subject to any disclaimer, the term of this patent is extended or adjusted under 35 U.S.C. 154(b) by 0 days.

(21) Appl. No.: 10/049,263

(22) PCT Filed: Aug. 17, 2000

(86) PCT No.: PCT/GB00/03213

§ 371 (c)(1), (2), (4) Date: Apr. 26, 2002

(87) PCT Pub. No.: WO01/13507

PCT Pub. Date: Feb. 22, 2001

(30) Foreign Application Priority Data

Aug. 17, 1999 (GB) .............................................. 9919345  
Oct. 14, 1999 (GB) .............................................. 9924203

(51) Int. Cl.$^7$ .............................................. G05B 11/28
(52) U.S. Cl. ....................... 318/599; 318/254; 318/138; 318/439
(58) Field of Search ................................ 318/599, 254, 318/138, 439, 799, 812, 431

(56) References Cited

U.S. PATENT DOCUMENTS 4,935,708 A    6/1990   Weldon et al. ................ 322/62

(List continued on next page.)

FOREIGN PATENT DOCUMENTS

DE        42 04 645 A1      8/1993

(List continued on next page.)

OTHER PUBLICATIONS

British Search Report, Application No. GB 9924203.4, dated Mar. 6, 2000.

(List continued on next page.)

*Primary Examiner*—Karen Masih  
(74) *Attorney, Agent, or Firm*—Renner, Otto, Boisselle & Sklar

(57) ABSTRACT

An electrical machine comprises a rotor without windings, a stator having an armature winding 24, 25 and a field winding 10 for generating a magnetomotive force in a direction extending transversely of the magnetomotive force generated by the armature winding. An electronic circuit 40 is provided for controlling the current in the armature winding 24, 25 such that periods in which a magnetomotive force in one direction is associated with a first current pulse alternate with periods in which a magnetomotive force in the opposite direction is associated with a second current pulse. A position sensor is provided for monitoring the rotational position of the rotor and for supplying output signals at a rate dependent on the speed of rotation of the rotor. Furthermore a control system supplies control signals to the circuit 40 to control the current in the armature winding 24, 25 in response to the output signals. The control system uses a control signal of extended duration at the beginning of the first current pulse on start-up of the motor from rest as compared with the duration of the control signals produced over the remainder of the first current pulse during acceleration of the rotor. Such an arrangement produces efficient starting from rest, and enables control of acceleration, no-load speed, loaded torque-speed characteristics of the machine to be achieved with simple on-off control of armature and field switching devices, so that the control circuitry can be produced at relatively low cost. Simplification of the control circuitry is further ensured by the fact that such control can be effected without current sensing.

13 Claims, 6 Drawing Sheets

U.S. PATENT DOCUMENTS

| | | | | |
|---|---|---|---|---|
| 5,001,405 A | * | 3/1991 | Cassat | 318/254 |
| 5,334,917 A | * | 8/1994 | Lind | 318/254 |
| 5,359,272 A | | 10/1994 | Liao | 318/732 |
| 5,650,887 A | * | 7/1997 | Dovek et al. | 360/75 |
| 5,739,662 A | | 4/1998 | Li | 318/701 |
| 5,754,024 A | | 5/1998 | Sugiyama | 318/701 |

FOREIGN PATENT DOCUMENTS

| | | |
|---|---|---|
| EP | 0 735 633 A1 | 2/1996 |
| EP | 0 753 933 A1 | 1/1997 |
| EP | 0 837 549 A2 | 4/1998 |
| GB | 554827 | 7/1943 |
| GB | 2 194 693 A | 3/1988 |
| GB | 2 244 571 A | 12/1991 |
| SU | 1406697 A1 | 6/1988 |
| WO | 98/01942 | 1/1998 |
| WO | 98/05112 | 2/1998 |

OTHER PUBLICATIONS

British Search Report, Application No. GB 9919345.0, dated Dec. 20, 1999.
British Search Report, Application No. GB 9924203.4, dated Jun. 20, 2000.
British Search Report, Application No. GB 9924203.4, dated Jun. 15, 2000.
British Search Report, Application No. GB 9924203.4, dated Jun. 15, 2000.
British Search Report, Application No. GB 9924203.4, dated Jun. 14, 2000.

* cited by examiner

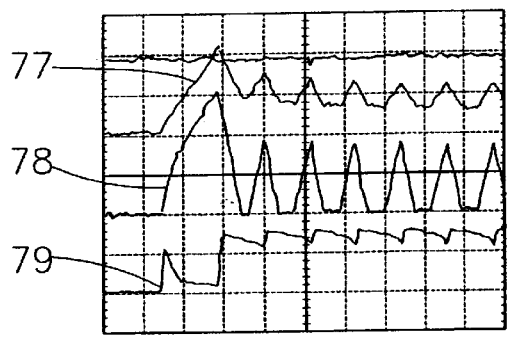
FIG10ª
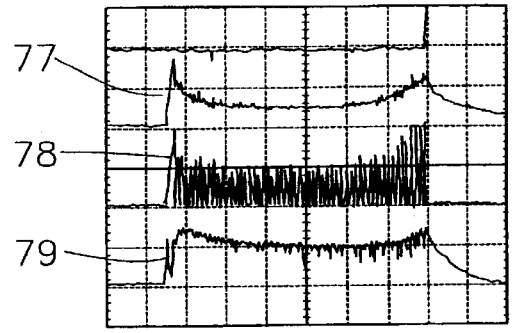
FIG10ᵇ
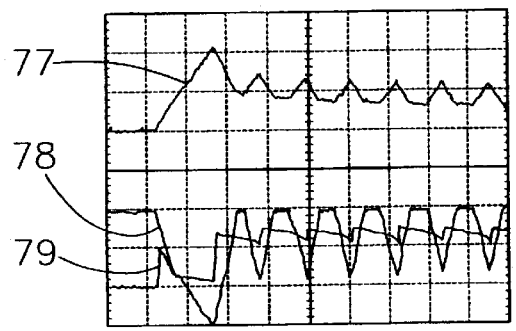
FIG10ᶜ
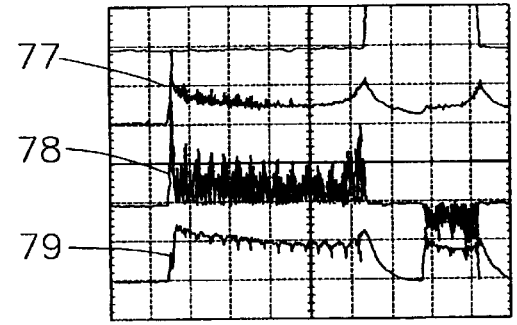
FIG10ᵈ
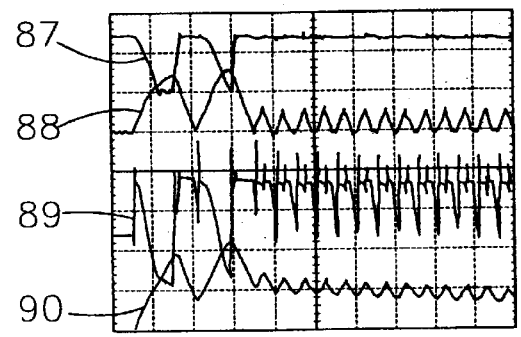
FIG10ᵉ
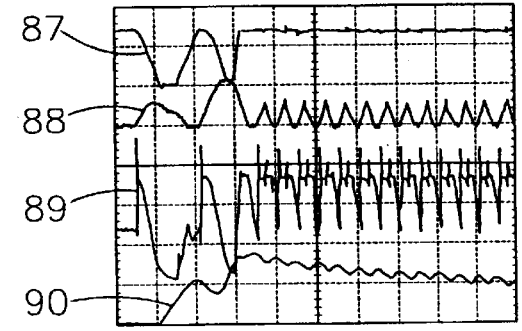
FIG10ᶠ

ELECTRICAL MACHINES

This invention relates to electrical machines, and is concerned more particularly, but not exclusively, with electric motors.

Reference is also made to the Applicants' co-pending Applications Nos. PCT/GB00/03197, PCT/GB00/03214 and PCT/GB00/03201 the disclosures of which are incorporated herein by reference.

FIGS. 1a and 1b shows a conventional two-phase variable reluctance motor comprising a stator 2 having two pairs 3, 4 of oppositely disposed inwardly directed salient poles provided with two pairs 5, 6 of energising windings corresponding to the two phases, and a rotor 7 having a single pair 8 of oppositely disposed outwardly directed salient poles without windings. Each of the four energising windings is wound about its corresponding pole, as indicated by the symbols Y—Y denoting two diametrically opposite portions of each winding of the winding pair 6 and the symbols X—X denoting two diametrically opposite portions of each winding of the winding pair 5. An excitation circuit (not shown) is provided for rotating the rotor 7 within the stator 2 by alternately energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers the advantage over a conventional wound rotor motor that a commutator and brushes, which are wearing parts, are not required for supply of current to the rotor. Furthermore other advantages are provided because there are no conductors on the rotor and high-cost permanent magnets are not required, The symbols + and − in FIGS. 1a and 1b show the directions of current flow in the windings in the two alternate modes of excitation in which the rotor 7 is attracted either to the horizontal position or to the vertical position as viewed in the figures. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in only one direction during such energisation. However the windings can only be energised for a maximum of half the time per revolution if useful torque is to be produced, so that highly efficient utilisation of the electrical circuit is not possible with such a motor.

By contrast a fully pitched variable reluctance motor, as described by J. D. Wale and C. Pollock, "Novel Converter Topologies for a Two-Phase Switched Reluctance Motor with Fully Pitched Windings", IEEE Power Electronics Specialists Conference, Braveno, June 1996, pp. 1798–1803 and as shown in FIGS. 2a and 2b (in which the same reference numerals are used to denote like parts as in FIGS. 1a and 1b) comprises two windings 10 and 11 having a pitch which is twice the pole pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Furthermore two alternate modes of excitation of such a motor corresponding to the horizontal and vertical positions of the rotor 7 are shown in FIGS. 2a and 2b from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used. However the winding 11, which may be termed the armature winding, must be energised with current which alternates in synchronism with the rotor position so as to determine the changing orientation of the stator flux required to attract the rotor alternately to the horizontal and vertical positions. The need to supply the armature winding with alternating current in such a motor can result in an excitation circuit of high complexity and cost.

J. R. Surano and C-M Ong, "Variable Reluctance Motor Structures for Low-Speed Operation", IEEE Transactions on Industry Applications, Vol. 32, No. 2, March/April 1996, pp 808–815 and UK Patent No. 2262843 also disclose fully pitched variable reluctance motors. The motor disclosed in UK Patent No. 2262843 is a three-phase variable reluctance motor having three windings which must be energised with current in synchronism with rotation of the rotor so that such a motor requires an excitation circuit of high complexity.

WO 98/05112 discloses a flux-switching motor having a four-pole stator 2 which, as shown diagrammatically in FIG. 3a, is provided with a field winding 10 and an armature winding 11 each of which is split into two coils 22 and 23 or 24 and 25 closely coupled (with a coupling which is substantially independent of rotor position) and wound so that diametrically opposite portions of both coils are disposed within diametrically opposite stator slots. FIG. 3b shows a generalised circuit diagram for energising the armature coils 24 and 25. The coils 24 and 25 are connected within the circuit so that direct current supply to the terminals 26 and 27 flows through both coils 24 and 25 in the same direction so as to generate magnetomotive forces in opposite direction as a result of the opposite winding of the coils. Switches 28 and 29, which may comprise field effect transistors or thyristors for example, are connected in series with the coils 24 and 25 and are switched alternately to effect alternate energisation of the coils 24 and 25 so as to provide the required magnetomotive forces acting in opposite directions. It is an advantage of such an arrangement that the armature winding is made up of two closely coupled coils which enables each coil to be energised with current in only one direction so that relatively simple excitation circuitry can be used. A similar arrangement may be provided in an electrical alternator.

GB 18027 dated Sep. 9, 1901 discloses a variable reluctance machine having sets of windings on the stator which are alternately energised so as to provide the required interaction with the rotor. Furthermore GB 554827 discloses an inductor alternator in which the relative arrangement of the stator and rotor teeth produces successive zones of relatively high and low reluctance, and in which field and alternative current windings are provided on the stator to effect the required energisation. However, neither of these prior arrangements possesses the advantageous feature of the closely coupled coils arrangement of WO 98/05112 so that complex associated circuitry is again required.

The simplifications in the circuitry introduced by WO 98/05112 enable simple and low cost electronic machine control, but reduce the flexibility of the machine to be controlled under rapid acceleration or deceleration, as well as reducing the control of speed under load.

It is an object of this invention to provide an electrical machine which has simple control circuitry but can also achieve high performance.

According to the present invention, there is provided an electrical machine comprising a rotor without windings, a stator having an armature winding and field magnet means or generating a magnetomotive force in a direction extending transversely of the magnetomotive force generated by the armature winding, circuit means for controlling the current in the armature winding such that periods in which a magnetomotive force in one direction is associated with a first current pulse alternate with periods in which a magnetomotive force in the opposite direction is associated with a second current pulse, and position sensing means for monitoring the rotational position of the rotor and for supplying output signals at a rate dependent on the speed of rotation of the rotor, characterised by control means for supplying control signals to the circuit means to control the current in the armature winding in response to said output signals, the control means being arranged to produce a control signal of extended duration at the beginning of the first current pulse on start-up of the rotor from rest as compared with the duration of the control signals produced over the remainder of the first current pulse.

Such an extended current pulse at start-up helps to establish the winding currents without causing a snubber over-voltage, for example. Preferred embodiments of the invention allow control of acceleration, no-load speed, loaded torque-speed characteristics and braking of the machine to be achieved with simple on/off control of armature and field switching devices, so that the appropriate control circuitry can be produced at relatively low cost. Simplification of the control circuitry may be further assured by effecting such control without current sensing.

In order that the invention may be more fully understood, reference will now be made, by way of example, to the accompanying drawings, in which:

FIGS. 10a, 10b, 10c, 10d, 10e and 10f are timing diagrams showing the control signals applied during start-up of the motor in preferred embodiments of the invention.

Figure 1A:
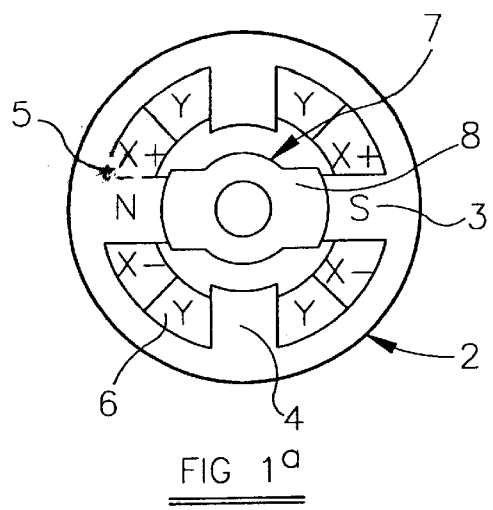
FIGS. 1a and 1b are explanatory diagrams showing a conventional two-phase variable reluctance motor, with the two excitation modes being shown in FIGS. 1a and 1b.
Figure 1B:
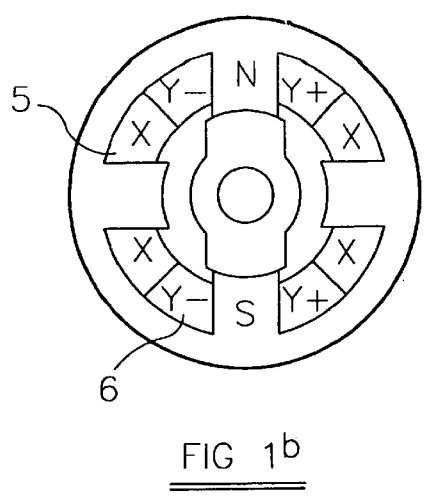
Figure 2A:
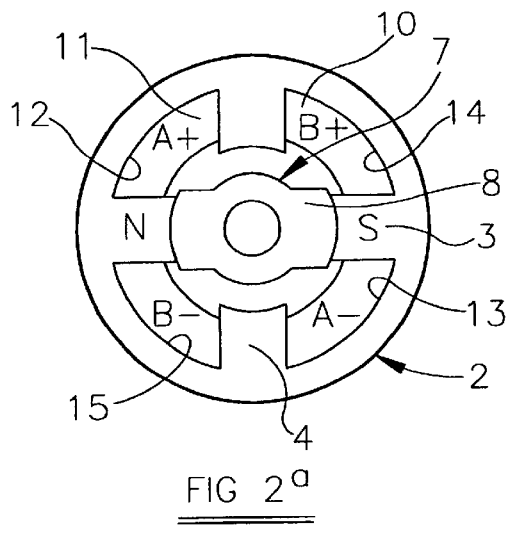
FIGS. 2a and 2b are explanatory diagrams showing a flux-switching motor, with the two excitation modes being shown in FIGS. 2a and 2b.
Figure 2B:
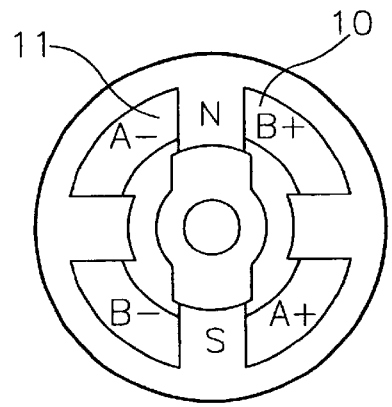
Figure 3A:
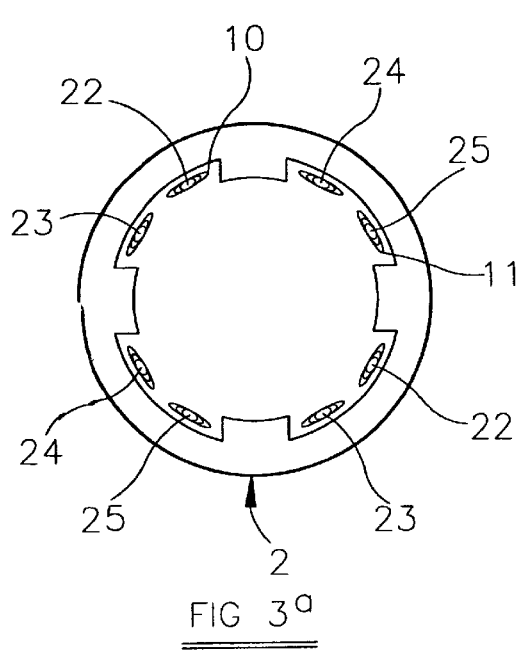
FIGS. 3a and 3b are explanatory diagrams showing the stator windings for a flux-switching motor as disclosed in WO 98/05112.
Figure 3B:
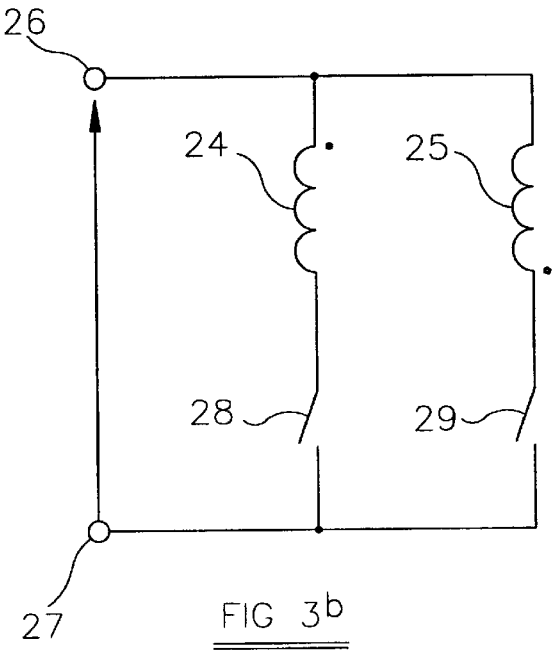
Figure 4:
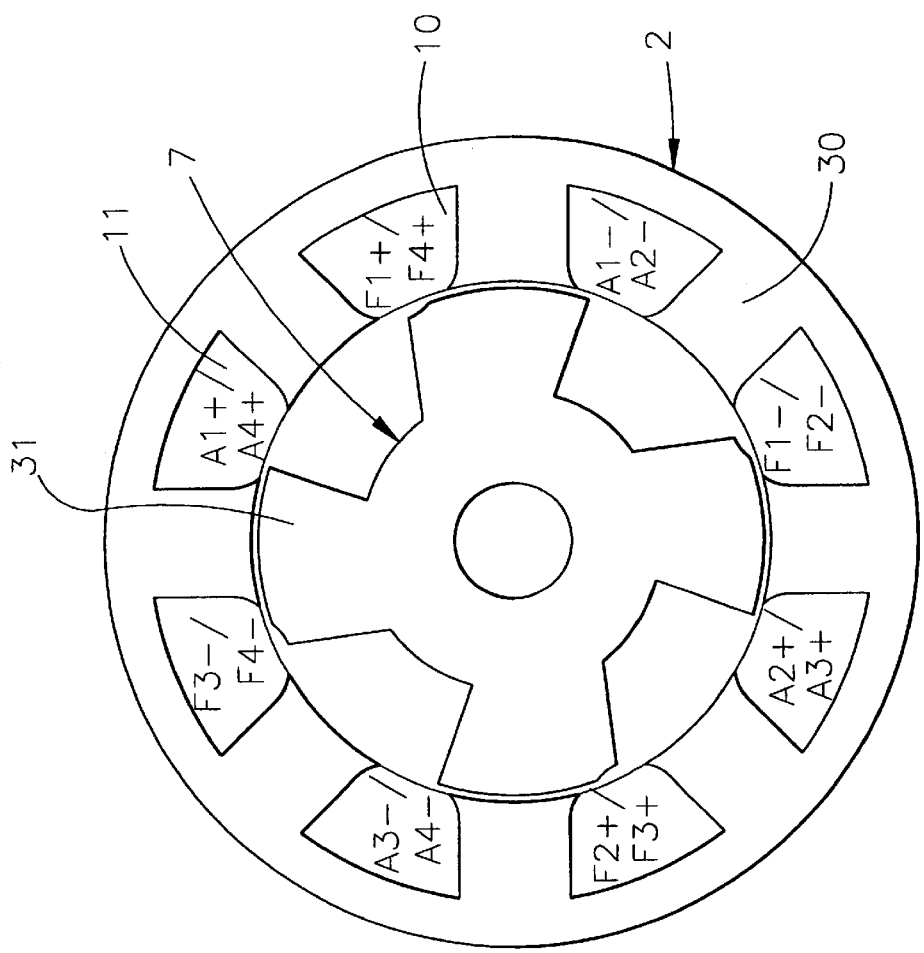
FIG. 4 is a diagram of a flux-switching motor having an 8-pole stator and a 4-pole rotor.

The following description of an embodiment of the invention is given with reference to a flux-switching series motor having a stator 2 provided with eight inwardly directed salient poles 30 and a rotor 7 having four outwardly directed salient poles 31 without windings, as shown in FIG. 4. The stator 2 is provided with a field winding 10 and an armature winding 11 connected in a series configuration. The armature winding 11 and the field winding 10 comprise four armature winding parts A1, A2, A3 and A4 and four field winding parts F1, F2, F3 and F4 connected in series or in parallel (or any combination of series and parallel), each armature winding part being split into two coils which are closely magnetically coupled and wound so that diametrically opposite portions of the coils are disposed within two stator slots which are separated by a field winding slot. The armature coils are wound in opposite directions and may be bifilar wound where appropriate. In FIG. 4 the symbols + and − show the directions of current flow in the windings in one mode of excitation, and it will be understood that, in the alternate mode of excitation, the direction of current flow in the armature windings is reversed whereas the direction of current flow in the field windings is unchanged.

Figure 5:
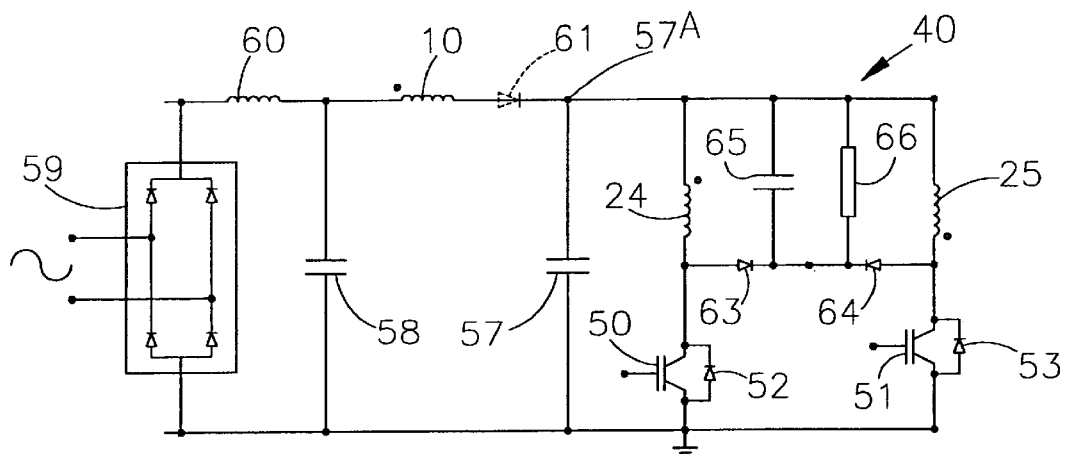
FIGS. 5 and 6 are circuit diagrams showing different circuit arrangements for energising the field and armature windings of such a motor.

FIG. 5 shows an energisation circuit 40 for supplying current to the field winding 10 and the closely coupled armature coils 24 and 25 (each being considered as the combination of the coils of the four armature winding parts A1, A2, A3 and A4 of FIG. 4), where the field winding 10 is connected in series with the electrical supply to the circuit. The circuit 40 is supplied from an alternating current source by way of a rectifier bridge 59. A switching control circuit comprising two IGBT'S 50 and 51 (or MOSFET's) is provided to supply current alternately to the armature coils 24 and 25 so as to provide the required magnetomotive forces acting in opposite directions to rotate the rotor. Each IGBT 50 or 51 includes an integral freewheeling diode 52 or 53 so that, as each IGBT is turned off, the stored magnetic energy in the corresponding coil is coupled to the other coil and flows back through the freewheeling diode of the other IGBT. Furthermore the ends of the armature coils 24 and 25 are connected by diodes 63 and 64 to a snubber capacitor 65 which charges to a voltage above the supply rail voltage. The snubber capacitor 65 is discharged by the parallel resistor 66 so as to dump the energy stored in the snubber capacitor 65 from the imperfect switching process. The snubber capacitor 65 is provided to capture energy not transferred to the other armature coil when one of the armature coils is switched off by its respective switching device.

The additional snubber circuit formed by the components 63, 64, 65 and 66 is particularly important when insulated gate bipolar transistors (IGBT's) are used as the switching devices. IGBT's are easily damaged by device overvoltage, and the snubber circuit is used to contain the voltages occurring in the circuit to a level less than the voltage rating of the IGBT's. When MOSFET's are used as in FIG. 5, the snubber circuit can be dispensed with if the MOSFET's are chosen to provide an inherent voltage clamp as they enter a breakdown (avalanche) mode above their rated voltage. This breakdown mode absorbs the uncoupled magnetic energy associated with the imperfect coupling of the armature windings with one another. Provided that adequate heat dissipation is available the MOSFET's will not suffer any damage through this process, and the complexity and cost of the snubber circuit is not therefore required.

A capacitor 57 is connected to the interconnection point between the field winding 10 and the armature coils 24, 25 so as to allow the field current to continue to flow as the energy from the armature winding is returned back to the capacitor 57 through one of the diodes 52 or 53. A further capacitor 58 is connected across the output of the rectifier bridge 59, and an optional inductor 60 is connected in series with the output of the rectifier bridge 59, so as to filter the supply to the circuit. As shown in broken lines, it is also possible to provide a diode 61 in series with the field winding 10 to prevent the current in the field winding 10 reversing when the capacitor 57 is charged to a voltage above the supply voltage on the capacitor 58. However the diode 61 can be omitted if required. The rectifier bridge 59 (and optionally the capacitor 58 and inductor 60) may be replaced by a battery or other form of d.c. supply without departing from the scope of the invention.

In accordance with the invention, the flux-switching motor should be designed so that the magnetomotive force in the field winding is related to the magnetomotive force in the armature winding for optimum performance. Preferably the turns $N_f$ in the field winding are chosen to correspond to the desired field magnetomotive force $MMF_f$ which is related to the working armature magnetomotive force $MMF_a$ (based on a rms value) by the relationship:

$$MMF_f = k.MMF_a.$$

Preferably the constant k has a value in the range 0.6 to 1.8, and most preferably in the range 1.0 to 1.5.

For a given power output, the input power can be calculated by the addition of the power losses to the output power. The average field current in series with the motor is then determined by the power input divided by the d.c. supply voltage. The number of turns $N_f$ in the field winding may therefore be set to be approximately equal to:

$$\frac{MMF_f \cdot V_{dc}}{P_{in}}$$

where $V_{dc}$=dc supply voltage (based on an average value); and $P_{in}$=input power, estimated from the required output power.

The number of armature turns should be chosen to give the correct operating speed at the required torque output.

Figure 6:
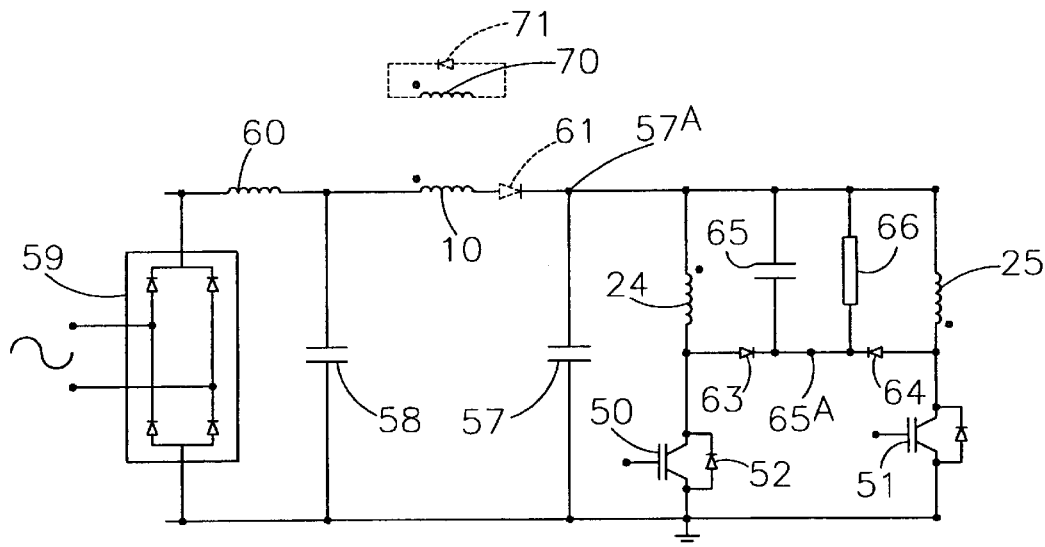

FIG. 6 shows a modification of such a circuit in accordance with the invention in which a secondary field winding 70 is closely coupled to the main field winding 10, and a diode 71 is connected to effectively short circuit the secondary field winding 70. Induced currents are caused to flow in the secondary field winding 70 in such a way as to limit variation in the field flux due to changes in reluctance and armature excitation. This arrangement also offers some reduction in the level of the ripple current in the main field winding 10. The diode 71 in series with the secondary field winding 70 limits the current flow in the winding 70 to the direction which aids the main field winding 10 whilst still offering some reduction in the ripple current. It has been shown experimentally that such an arrangement is capable of reducing input current ripple whilst increasing the power delivered by the motor for a given armature current. A diode 61 may again be optionally provided in series with the main field winding 10.

On initial start-up of such a motor, special measures must be taken to ensure correct starting. The applicants' co-pending Applications Nos. PCT/GB00/— and PCT/GB00/—(M&C Ref. P50539PC and P51247PC) disclose a special starting procedure using pulse width modulation for a motor having a field winding connected in a shunt or parallel configuration. However such a pulse width modulation method has been found to be ineffective in starting a motor of the type having its field winding in a series configuration. This is because the voltage on the capacitor 57 increases during chopping in such a pulse width modulation method and no significant current is drawn through the series field winding. In this case the armature excitation alone is not sufficient to start the motor.

A number of different methods have been evaluated for starting such a motor having its field winding in a series configuration, including single pulse and pulse width modulation methods (differing frequencies and duty cycles). However it has been concluded that single pulse methods lead to excessively large currents at low speed forcing the pulses to be too short to be effective. Furthermore pulse width modulation methods, although initially considered more promising, quickly lead to excessive snubber voltages being produced. Such excessive snubber voltages are caused by build-up of energy in the capacitor 57 which in turn lifts the armature supply voltage on which the snubber voltage is superimposed. Furthermore this build-up of armature voltage during pulse width modulation reduces the field current flowing and thus reduces the initial torque.

Figure 7:
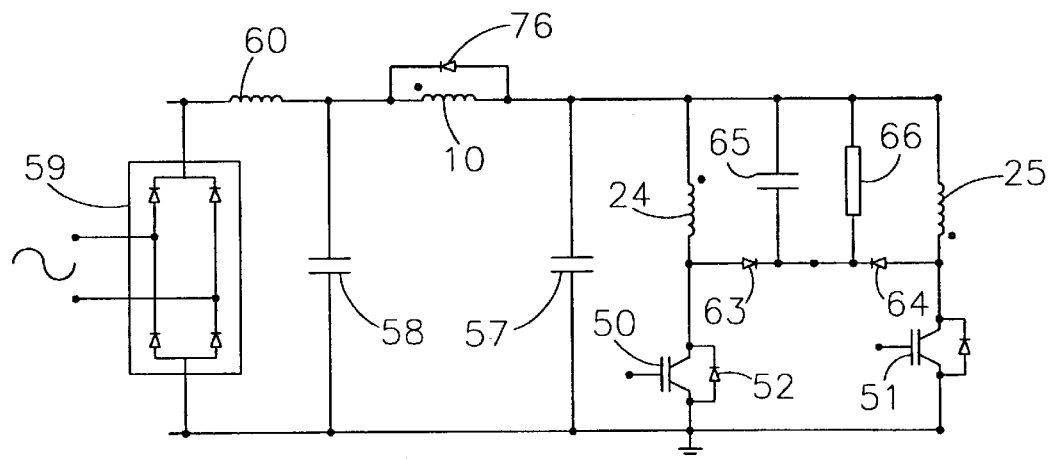
FIGS. 7, 8 and 9 are circuit diagrams showing further circuit arrangements for energising the field and armature windings of such a motor.

Accordingly a further modification to the circuit is proposed, where high rates of acceleration are required in which a diode 76 is connected in parallel with the field winding 10, as shown in FIG. 7, in order to ensure that the voltage across the capacitor 57 cannot exceed the voltage on the capacitor 58 during the start-up process. Such an arrangement has been shown to prevent excessive voltage build-up on the capacitor 57, which could damage the switching devices, whilst retaining the benefit of the capacitor 57 allowing rapid initialisation of armature current at the start of each pulse before the field current can be fully established. The provision of the diode 76 enables pulse width modulation to be used. However, in order to minimise the snubber voltage whilst controlling sufficient current to guarantee starting, it is necessary for the initial chopping frequency to be reduced. It has been found that, even with the initial chopping frequency being reduced to 1.7 kHz and with the initial duty cycle being set to the maximum possible value for acceptable snubber voltages, there are still positions of the rotor close to the aligned position where the motor fails to produce enough starting torque.

This can be resolved by applying one or more large initial pulses to the first armature switch before initiating conventional pulse width modulation chopping. For example, the initial pulse width may be optimised at 720 μs so as to produce in excess of 60 A of armature current in some positions of the rotor. In this case, when the armature switch is turned off at the end of the pulse, there is a considerable rise in the snubber voltage. However, since this is the initial pulse applied to the discharged snubber capacitor, this does not lead to over-voltage. Furthermore the provision of such an initial pulse prior to conventional pulse width modulation has the added advantage that it leads to a more rapid establishment of the field current in order to accelerate the rotor. In other motors tested with the circuits according to the invention it was preferable to apply several successive pulses of predetermined values to the appropriate armature switch. This allowed the armature current to decay during the time between the pulses. However the field current did not decay as rapidly due to the presence of the diode 76 (or thyristor 80) such that the second pulse of armature current lead to a further and more rapid increase in the field current than would be achieved with only a single long pulse.

Such starting methods have been successfully tested with a number of static advance angles and with different capacitance values of the capacitor 57. However starting is more reliable with smaller capacitance values of the capacitor 57 as larger values (greater than 15 µF) lead to a phase lag in the build-up of the field current.

FIGS. 10a, 10b, 10c and 10d show timing diagrams during start-up of a motor using a static advance angle of 6° and a capacitance value of 7.5 µF for the capacitor 57, the initial pulse width being 720 µs and the subsequent pulse width modulation having a frequency of 1.785 kHz and a duty cycle of 0.36. In FIG. 10a, reference numeral 77 denotes the field current, 78 denotes one polarity of the armature current and 79 denotes the voltage at the node 65A in FIG. 7. This shows that the provision of the initial pulse of 720 µs width produces a build-up in the field current 77, but that the field current gradually decays during the application of subsequent pulses. Furthermore the voltage across the switching devices is initially increased by the initial pulse, but does not subsequently rise to a greater level during application of subsequent pulses. FIG. 10(b) shows corresponding current and voltage waveforms for the case where start-up occurs with the rotor in the opposite position relative to the sensor which gives rise to armature current of opposite polarity at the same field current. FIG. 10c shows the current and voltage waveforms on a more compressed scale than in FIG. 10a so that the build up of the field and armature currents 77 and 78 and the voltage 79 leading up to the first edge 80 of the sensor output can be seen. FIG. 10d shows the field and armature currents 77, 78 and the voltage 79 on a still more compressed scale so as to indicate the provision of a delay of 14 ms (25 pulse width modulation cycles) following the first three sensor edges before the other armature coil is energised. During this time neither armature coil is excited so as to avoid excessive armature current and snubber voltage.

A modified start-up method is illustrated in FIGS. 10e and 10f in which two successive start-up pulses of increased width are used, rather than one, in order to maintain a snubber voltage of 1000 v while kick starting the motor. Reference numeral 87 denotes the voltage across the capacitor 57, 88 denotes one polarity of the armature current, 89 denotes the snubber voltage, and 90 denotes the field current. The length of the start-up pulses and the off time between them are given in Table 1. It will be noted that the total pulse time of the two pulses together is just in excess of 720 µs. FIG. 10f shows starting from a different position to FIG. 10e.

| Variable | Value |
| --- | --- |
| Pulse 1 | 405 µs |
| Off Time | 242 µs |
| Pulse 2 | 324 µs |

The subsequent pulse width modulation has a frequency of 5 kHz at a duty cycle of 40%.

Figure 8:
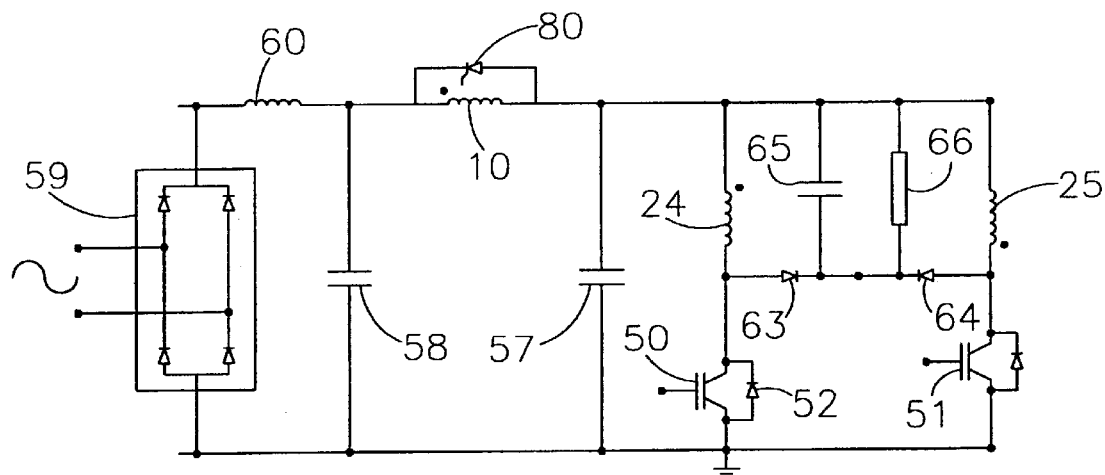

Whilst the provision of the diode 76 in parallel with the field winding 10 in the modification of FIG. 7 permits satisfactory starting of the motor, it has been found that the presence of the diode 76 removes the voltage boosting benefit of the capacitor 57 when the motor is running at high speed, and this in turn reduces the power output of the motor at any given speed (for a particular winding design). Accordingly, in some applications, it may be found advantageous to connect a mechanical switch in series with the diode 76 so that the diode 76 can be removed from the circuit once the motor has started. Instead of providing a mechanical switch in series with the diode 76, the diode 76 may be replaced by an electronic switch, such as a thyristor 80 as shown in FIG. 8. The thyristor 80 is turned on during start-up and acceleration of the motor, but is turned off when the motor reaches the desired operating speed. In this regard commutation of the thyristor 80 will occur naturally when the voltage on the capacitor 57 falls below the voltage on the capacitor 58.

Figure 9:
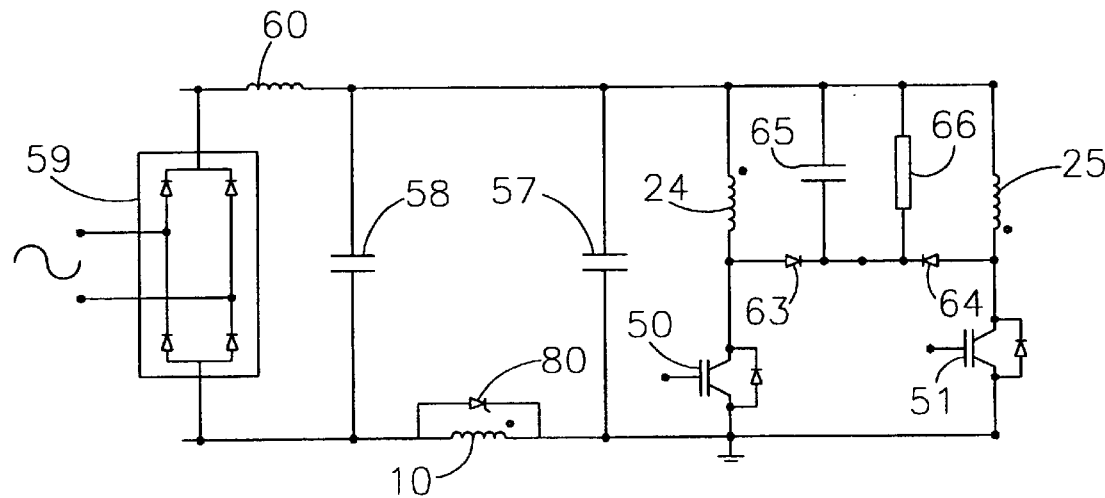

Furthermore FIG. 9 shows an alternative circuit arrangement to that of FIG. 8 in which the field winding 10 is placed in the return leg of the circuit, and the thyristor 80 is referenced to ground potential making the control of the thyristor 80 much simpler because it is referenced to the same supply rail voltage as the armature switches. As before, the thyristor 80 needs to conduct during start-up and acceleration of the motor, but is turned off when the motor reaches no load speed and will remain off during all subsequent loading. In the arrangements of both FIG. 8 and FIG. 9, care needs to be taken to ensure that the thyristor 80 commutates satisfactorily at the required speed, and to ensure that the thyristor 80 is not triggered by any rapid voltage transients. Alternatively the thyristor 80 may be replaced by an IGBT or MOSFET connected in series with a diode to block reverse conduction.

Figure 11:
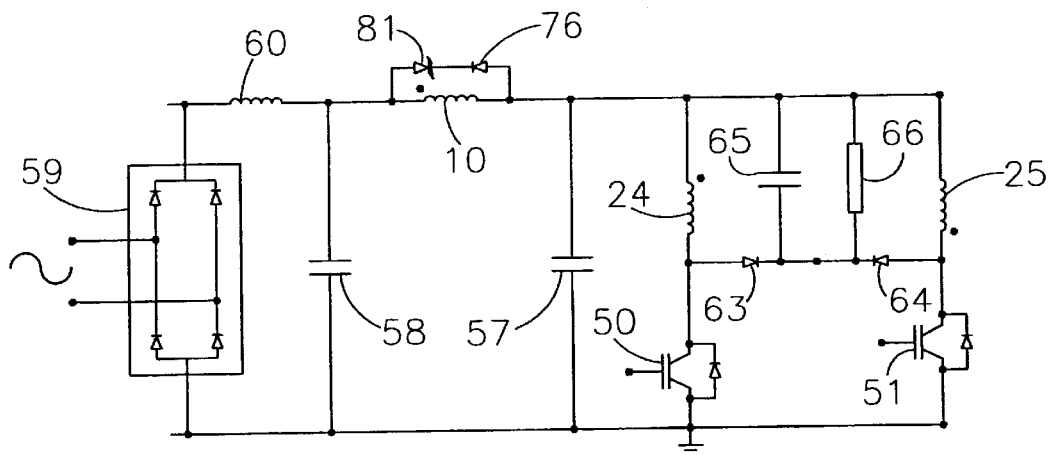
FIGS. 11 and 12 are circuit diagrams showing further circuit arrangements.

FIG. 11 shows a further possible circuit arrangement in which a voltage suppression device 81 in series with the diode 76 is connected in parallel with the field winding 10 to limit the build-up of voltage on the capacitor 57 during start-up of the motor. The voltage suppression device 81 will only conduct if the voltage on the capacitor 57 exceeds the voltage on the capacitor 58 by a predetermined amount and will then prevent the voltage exceeding that amount. The advantage of such a circuit arrangement is that the level of the voltage boosting during start-up and running can be accurately controlled without the need for an additional controlled switch. This has the effect of clamping the voltage once it has increased to the required value, whilst still allowing the capacitor 57 to provide voltage boosting during running.

Figure 12:
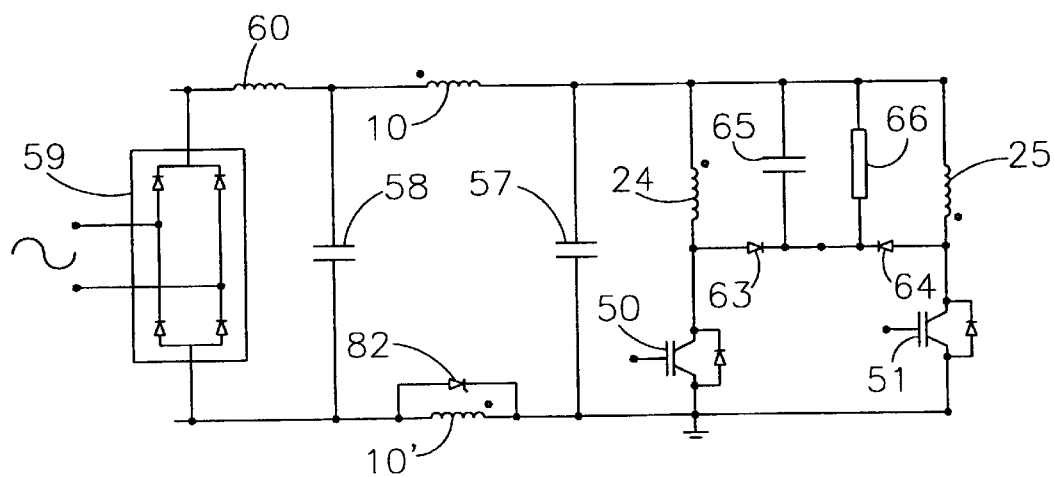

In certain applications it may be advantageous to split the field winding between the positive and negative supply rails in order to improve the efficiency of the motor. FIG. 12 shows an arrangement in which field windings 10 and 10' are provided in the positive and negative supply rails. Furthermore a thyristor 82 is connected in parallel with the winding 10'. In this case only one of the windings 10, 10' needs to be switched since, once the thyristor 82 is turned on, the voltage across the winding 10' is controlled, and, by virtue of the close magnetic coupling of the two field windings, this will also control the voltage across the winding 10, thus ensuring that the voltage on capacitor 57 cannot exceed the voltage on capacitor 58.

What is claimed is:

1. An electrical machine comprising a rotor without windings, a stator having an armature winding and field magnet means for generating a magnetomotive force in a direction extending transversely of the magnetomotive force generated by the armature winding, circuit means for controlling the current in the armature winding such that periods in which a magnetomotive force in one direction is associated with a first current pulse alternate with periods in which a magnetomotive force in the opposite direction is associated with a second current pulse, and position sensing means for monitoring the rotational position of the rotor and for supplying output signals at a rate dependent on the speed of rotation of the rotor, characterised by control means for supplying control signals to the circuit means to control the current in the armature winding in response to said output signals, the control means being arranged to produce a control signal of extended duration at the beginning of the first current pulse on start-up of the rotor from rest as compared with the duration of the control signals produced over the remainder of the first current pulse.

2. A machine according to claim 1, wherein rectifying means is connected in parallel with the field winding to prevent excessive build-up of the armature supply voltage on start-up of the rotor from rest.

3. A machine according to claim 1, wherein, in a low speed mode, the control means is arranged to produce pulse width modulated control signals having a duty cycle which increases with increasing speed of the rotor to control the current in the armature winding when the rotor is rotating at a relatively low speed.

4. A machine according to claim 1, wherein, in a high speed mode, the control means is arranged to produce control signals which are not pulse width modulated to control the current in the armature winding when the rotor is rotating at a relatively high speed.

5. A machine according to claim 1, wherein the field magnet means incorporates a field winding connected in series with the armature winding.

6. A machine according to claim 5, wherein the circuit means incorporates principal terminals and capacitance means, and wherein the capacitance means comprises a capacitance coupled between one of the principal terminals and the end of the field winding to which the armature winding is coupled, the capacitance value of the capacitance being such that the voltage across the capacitance is capable of rising to a level at which it promotes rapid initialisation of the armature current at the start of each current pulse.

7. A machine according to claim 1, wherein the armature winding comprises armature coils connected to the circuit means such that the currents in the coils vary in synchronism with rotation of the rotor in such a manner that periods in which a magnetomotive force in one direction is associated with current flow in one of the coils alternate with periods in which a magnetomotive force in the opposite direction is associated with current flow in the other coil.

8. A machine according to claim 7, wherein the coils are closely coupled magnetically.

9. A machine according to claim 7, wherein the circuit means comprises respective switch means for alternately conducting first current pulses in one of the armature coils and second current pulses in the other armature coil under the control of the control means.

10. An electrical machine comprising a rotor without windings, a stator having an armature winding and a field winding for generating a magnetomotive force in a direction extending transversely of the magnetomotive force generated by the armature winding, the armature and field windings being connected in a series configuration, and circuit means for controlling supply of current to the armature winding such that periods in which a magnetomotive force in one direction is associated with a first current pulse alternate with periods in which a magnetomotive force in the opposite direction is associated with a second current pulse, characterised in that a secondary winding is closely coupled to the field winding and is connected in a circuit with rectifying means so that current flow is induced in the secondary winding and the rectifying means by current flow in the field winding in such a manner as to tend to maintain the flux in the field winding substantially constant.

11. An electrical machine comprising a rotor without windings, a stator having an armature winding and a field winding for generating a magnetomotive force in a direction extending transversely of the magnetomotive force generated by the armature winding, the armature and field windings being connected in a series configuration, and circuit means for controlling supply of current to the armature winding such that periods in which a magnetomotive force in one direction is associated with a first current pulse alternate with periods in which a magnetomotive force in the opposite direction is associated with a second current pulse, characterised in that the desired field magnetomotive force $MMF_f$ is related to the working armature magnetomotive force $MMF_a$ by a substantially constant value k.

12. A machine according to claim 11, wherein the number of turns in the field winding is substantially proportional to the product of the armature magnetomotive force and the supply voltage divided by the power input.

13. A machine according to claim 11, wherein k has a value in the range 0.6 to 1.8.

* * * * *